No. 611,052. Patented Sept. 20, 1898.
F. BRUCKER.
WHEEL TIRE.
(Application filed Jan. 11, 1898.)
(No Model.)
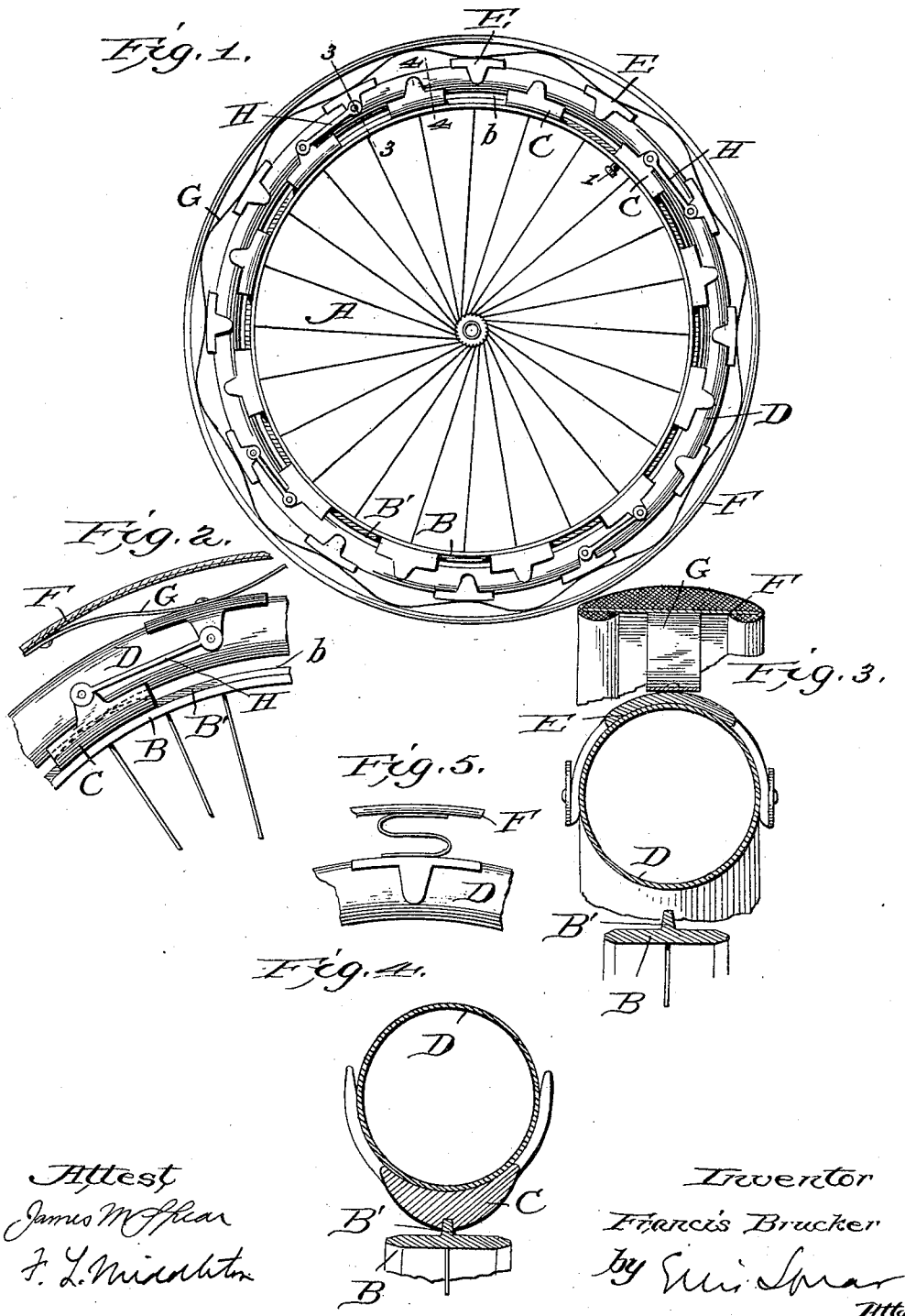

UNITED STATES PATENT OFFICE.

FRANCIS BRUCKER, OF SHELBY, OHIO.

WHEEL-TIRE.

SPECIFICATION forming part of Letters Patent No. 611,052, dated September 20, 1898.

Application filed January 11, 1898. Serial No. 666,319. (No model.)

*To all whom it may concern:*

Be it known that I, FRANCIS BRUCKER, a citizen of the United States, residing at Shelby, in the county of Richland and State of Ohio, have invented certain new and useful Improvements in Wheel-Tires, of which the following is a specification.

My invention relates to certain improvements in tires for bicycles and other vehicles; and the object of the invention is to provide a tire which while embodying in its construction a pneumatic tube, and thus securing the highest possible degree of resilience, shall be proof against the evils arising in the use of the ordinary pneumatic tires by reason of punctures from sharp substances encountered upon the road.

My invention is illustrated in the accompanying drawings, in which—

Figure 1 is a side elevation of a wheel with the improved tire applied thereto. Fig. 2 is an enlarged detail view. Fig. 3 is a cross-section on line 3 3 of Fig. 1. Fig. 4 is a section on line 4 4 thereof. Fig. 5 is a view of a modified form of spring.

The wheel, which is shown at A, may be of the ordinary or any desired construction, with the exception of the rim B, which is preferably formed in the shape shown in cross-section in Figs. 3 and 4, comprising the laterally-arranged portion or rim proper, B, and the circumferential flange or rib B', arranged centrally thereof. At intervals around this rim are placed bearing-shoes C, which are provided with grooves to receive the circumferential rib and are curved on their outer faces to correspond to and receive the inner face or side of the pneumatic tube D. Corresponding shoes E are located on the outer face of the pneumatic tube, the outer shoes being arranged out of line with or intermediate of the shoes C. The faces of the shoes which contact with the pneumatic tube are curved or rounded lengthwise, as shown in dotted lines in Fig. 2, to provide a rounded bearing for the tube. At a slight distance from and concentric with the pneumatic tube is a steel band or tire proper, F, which may be of any desired shape in cross-section. This band is supported and held in place by springs G, extending between the shoes E and the inner surface of the tire or band and connected with each by rivets or other suitable fastening means.

Instead of using separate springs to connect the shoes and rim I may use a continuous spring alternately connected to each, though it will be understood that I do not desire to limit myself to the precise form of spring. At suitable intervals—for instance, at each quarter of the circumference of the wheel—links H are provided, extending from one of the outer shoes E to one of the inner shoes B, as clearly shown in Fig. 2, in order to prevent any creeping of the parts one upon the other. The pneumatic tube is provided with the usual inflating-valve *l*, and it will be observed that when deflated it may be easily removed from between the shoes and replaced.

From the above description it will be seen that an exceedingly resilient and easy-riding tire is provided, as I secure the spring-action of the pneumatic tube, aided by the spaces *b* between the shoes C, into which spaces the tube can bend or spring, and, further, the elastic or spring action of the spring G, interposed between the steel band and the pneumatic tube, while all liability of mishap due to punctures is entirely avoided.

Having thus described my invention, what I claim is—

1. In combination, the rim, the pneumatic tube supported therefrom, shoes carried upon the outer periphery of the tube, an outer metal tire concentric therewith, and the spring connection between said shoes and tire, substantially as described.

2. In combination, the wheel-rim, the shoes seated thereon, the pneumatic tube seated on the shoes, the outer shoes seated on the outer periphery of the tube, the outer metal tire and the spring connection between the outer shoes and metal tire, substantially as described.

3. In combination, the wheel-rim, the shoes seated thereon, the pneumatic tube seated on the shoes, the outer shoes seated on the outer periphery of the tire, the link connections between adjoining inner and outer shoes, the outer metal tire, and the spring connection between the tire and outer shoes, substantially as described.

In testimony whereof I affix my signature in presence of two witnesses.

FRANCIS BRUCKER.

Witnesses:
DUANE M. DOTY,
JOHN MCINTIRE.